July 4, 1944.  D. G. GRISWOLD  2,352,630
LIQUID LEVEL CONTROL APPARATUS
Original Filed May 17, 1939   3 Sheets-Sheet 1

INVENTOR
Donald G. Griswold
BY
Bacon + Thomas
ATTORNEYS

Patented July 4, 1944

2,352,630

UNITED STATES PATENT OFFICE 2,352,630

LIQUID LEVEL CONTROL APPARATUS

Donald G. Griswold, Alhambra, Calif., assignor to Clayton Manufacturing Company, Alhambra, Calif.

Original application May 17, 1939, Serial No. 274,288, now Patent No. 2,243,815, dated May 27, 1941. Divided and this application March 11, 1941, Serial No. 382,803

19 Claims. (Cl. 137—68)

The present invention relates to liquid level control apparatus of general utility, but particularly adapted for use with water softeners, and especially in water softening systems or apparatus having control means for effecting regeneration of the system at the will and convenience of the user.

The liquid level control apparatus constituting the present invention has been shown in association with a water softening system in order to illustrate one form of its utility. The water softening system disclosed comprises a softener tank, a brine tank, a fluid distribution device, a master control device for controlling the cycle of operation of the system and the liquid level or brine control apparatus interposed between the brine tank and the fluid distribution device. The liquid level control apparatus is arranged to provide for draining of the brine tank during the salting step and for automatic refilling of the brine tank after completion of the rinsing step. The brine tank control mechanism includes a pilot controlled diaphragm type brine valve which is unique in that it is responsive to both pressure and vacuum conditions and is arranged so that when an injector associated with the fluid distribution device is in operation, the suction provided thereby will tend to induce a vacuum condition and thus reduce the pressure normally acting on the diaphragm to close the same. This reduced pressure on one side of the diaphragm permits opening of the valve by the brine itself which is under atmospheric pressure effective upon the other side of said diaphragm and the injector can then readily withdraw the charge of brine from the brine tank. This valve is further arranged so that it is closed by air under atmospheric pressure after a predetermined volume of brine has been withdrawn from the brine tank, by the injector. The same valve is later automatically reopened when a master pilot valve disc in the water control device is restored to a position permitting normal softening operation. The drain from the distribution device is then closed so that a back pressure builds up in the softener tank and is communicated through the brine pipe to the valve seat side of the diaphragm. When this pressure exceeds atmospheric, the brine valve opens to permit refilling of the brine tank. The brine valve is again closed when the level in the brine tank has reached a predetermined desired height. A pilot valve disc in the brine valve controls the application of pressure to the diaphragm and hence the opening and closing of said valve. The brine pilot valve disc is actuated by a float in the brine tank.

The instant application is particularly concerned with the brine or liquid level control apparatus and constitutes a division of my parent application Serial No. 274,288 filed May 17, 1939, entitled "Water softening apparatus," and now matured into Patent 2,243,815, granted May 27, 1941. Reference may be had to this patent for a full and complete description of the construction and mode of operation of the water softening apparatus as a whole, the present disclosure being limited only to such structure and explanation as appears necessary to an understanding of the automatic liquid level control apparatus associated with the brine tank and the fluid distribution device.

The principal object of the invention is to provide an automatic liquid level control apparatus adapted for general use, particularly with apparatus including a tank containing a material requiring periodic regeneration.

Another object of the invention is to provide a simplified liquid level control apparatus including a valve arranged so that it serves both as an inlet valve to admit water into a tank and also as a withdrawal valve permitting liquid to be withdrawn from said tank.

Still another object of the invention is to provide, in water softening apparatus, an improved brine tank and control means therefor which automatically refills the brine tank and maintains a desired brine level in said tank.

Other and further objects of the invention will be apparent from the following description taken in conjunction with the accompanying drawings, in which.

Figure 1:
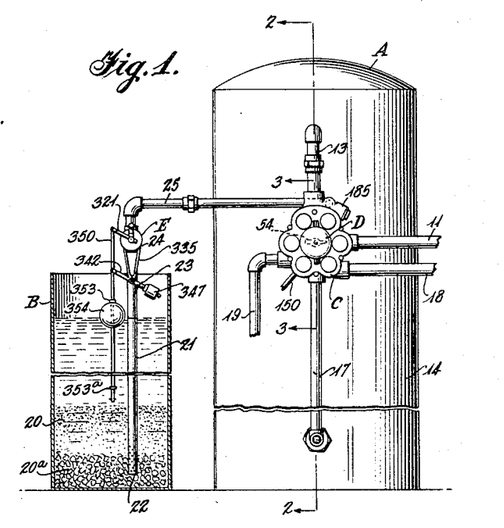
Figure 1 is a diagrammatic elevational view of a water softening apparatus embodying one form of the present invention and showing the brine tank in cross section.

Referring now to the drawings, and more particularly to Figure 1, the water softener is generally designated by the letter A, the brine tank by B, the hydraulically controlled fluid distribution device or unit by C, the manually operable master control device for starting the regenerating cycle by D, and the float-controlled valve and its associated linkage on the brine tank by E. The master control device D is mounted upon the fluid distribution device C and includes a control knob 54 adapted to be manually actuated to effect operation of the regenerating cycle of the water softener all as is set forth in my parent patent, supra. A brine injector 185 (not shown here in detail but fully disclosed in said patent) is mounted in the fluid distribution device C.

Figure 2:
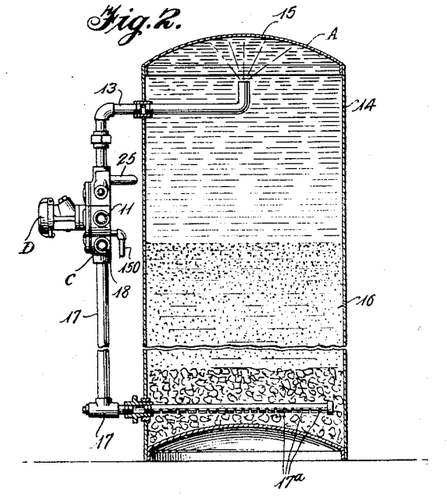
Figure 2 is a sectional view taken on the line 2—2 of Figure 1.

Raw water, i. e., the water to be treated, is introduced into the system through a supply pipe 11 connected to one side of the fluid distribution device C. The raw water introduced by the supply pipe 11 flows through the various passageways in the fluid distribution device C (shown and described in full in my Patent 2,243,815, supra, and also fully disclosed and claimed in my copending application Serial No. 383,802 filed March 11, 1941, and which, therefore, need not be described here) and is then conducted from said distribution device to the softener A by piping generally indicated at 13. As is clearly shown in Figure 2, the piping 13 extends into a softener tank 14 and is preferably arranged so that the discharge therefrom is upward toward the inside of the tank head 15.

The tank 14 of the softener A contains a bed 16 of zeolite (or other water softening material). Discharge piping 17 is arranged adjacent the bottom of the tank 14 and conducts the water that has passed through the bed 16 back to the distribution device C. A portion of the pipe 17 lies within the tank 14 and is provided with a series of downwardly facing slots 17a. The softened water enters the distribution device through the piping 17 and ultimately discharges into a service pipe 18. A pipe 150 serves to drain spent operating fluid from the hydraulically operated fluid distribution device C.

The brine tank B contains a bed of salt 20 and the usual layer of coarse gravel 20a. A pipe 21 extends through the salt bed 20, as shown in Figure 1, and one end 22 thereof is perforated and projects into the layer of gravel 20a. The opposite end 23 of the piping 21 is connected to a float controlled diaphragm valve generally indicated by the numeral 24. A pipe 25 connects the diaphragm valve 24 with the distribution device C. The valve 24 is only generally referred to at this point, and the details thereof will be described later. Likewise, the manner of flow of brine from the tank B to the softener A through the distribution device C under control of the valve 24 and mechanism E will be explained later.

Figure 3:
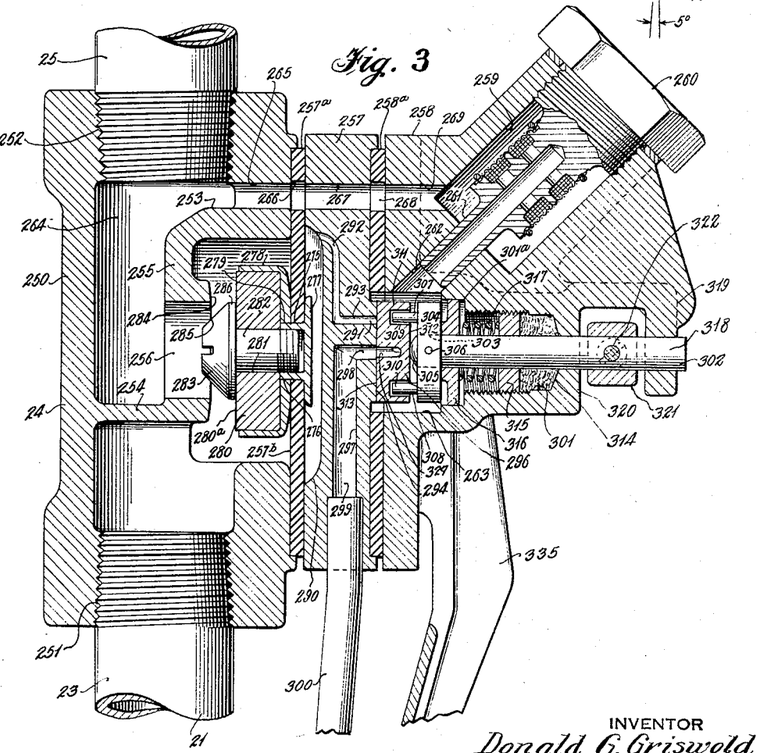
Figure 3 is an enlarged longitudinal sectional view of the float-controlled brine control valve.

Referring now to Figures 1 and 3, it will be noted that the valve 24 controls the flow of brine from the brine tank B into the pipe 25. This valve is of the diaphragm type and comprises a main body portion 250 having a threaded opening 251 in which the upper end 23 of the pipe 21 is received and a second threaded opening 252 in which one end of the pipe 25 is received. Intermediate the openings 251 and 252 are transverse partitions 253 and 254 connected by a longitudinal web 255. The web 255 is provided with an opening 256 whereby the passage of fluid may be permitted from the pipe 21 to the pipe 25, and vice versa, when said opening is unobstructed. The valve 24 comprises valve sections 257 and 258 in addition to the body portion 250. A diaphragm 257ª is interposed between the body 250 and the section 257 and a gasket 258ª is interposed between the sections 257 and 258.

The valve section 258 is provided with a chamber 259 in which is mounted a strainer plug 260. The plug 260 is provided with a hollow stem 261 which extends into an angular passageway 262 in the valve section 258. The section 258 is further provided with a circular chamber 263 into which the passageway 262 opens.

As is best shown in Figure 3, a continuous passageway is provided between a chamber 264 in the upper part of the body 250 and the chamber 259 in the valve section 258. This passageway comprises an opening 265 in the body 250, an opening 266 in the diaphragm 257ª, an opening 267 in the valve section 257, an opening 268 in the gasket 258ª, and an opening 269 in the valve section 258. It will be clear from the foregoing that any positive pressure condition existing in the chamber 264 will be communicated to the chamber 263 through the continuous passageway 265—269; the hollow stem 261 of the strainer plug 260; and the passageway 262.

The diaphragm 257ª is provided with a central aperture 275 for the reception of a nut having an internally threaded shank 276 extending axially from a substantially circular head 277. A metallic cup shaped element 278 is provided with an aperture 279 of a size adapted to snugly receive the shank 276. The hollow portion of the cup member 278 is formed to receive an annular packing element 280. The packing element 280 is provided with an axial opening 281 and a bolt 282 extends through said opening and has a threaded stem received in the shank 276. The bolt 282 serves to clamp the diaphragm between the head 277 and the cup 278 and at the same time to maintain the packing 280 assembled within said cup. The exposed face 280ª of the packing 280 is adapted to be held against an annular tapered seat 284 formed on the web 255, and when so held, all flow of fluid through the valve in either direction is prevented.

Figure 5:
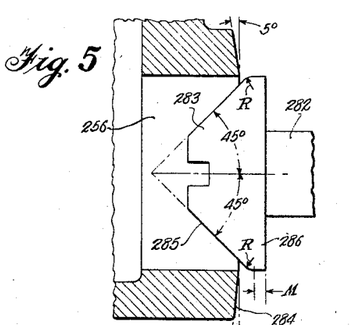
Figure 5 is a fragmentary view drawn to exaggerated scale showing specific details of the valve seat of the brine control valve and the head of the screw which retains the valve washer in assembled relation with the diaphragm.

A very important feature of the valve 24 is the provision of means conducive to quiet operation and gradual cutting-off of the flow through the valve without chatter. The above results are attained by providing the bolt 282 with a head 283 having an annular portion 285 tapered on substantially a 45° angle and a substantially cylindrical portion 286 of a desirable width M; the tapered portion 285 and the cylindrical portion 286 being connected by a curved portion struck on a suitable radius R, as indicated in the exaggerated Figure 5. The rounded surface between the tapered portion and the cylindrical portion cooperated with the edge of the valve seat 284 and serves to gradually cut off the flow of fluid through the valve seat opening 256 and in this manner whistling and squealing noises otherwise incidental to flow cut-off are eliminated. The operation of the valve is further improved by forming the annular valve seat 284 with a 5° taper.

The intermediate valve section 257 is provided with a shallow circular recess 290 adjacent one side of the diaphragm 257ª. The chamber 290 receives the nut head 277 and further functions as a receiver for pressure fluid intended to actuate the diaphragm 257ª to close the valve. A generally L-shaped passageway 291 is formed in the valve section 257. One end 292 of said passageway communicates with the upper portion of the chamber 290. This arrangement is important because it permits exhausting of the chamber at the highest point thereof and thereby precludes the formation of an air pocket in the chamber 290 which would tend to make the valve chatter. The opposite end 293 of the passageway 291 opens into the face of a boss 294. The face of the boss 294 is made smooth and is thus adapted to provide a seat for a disc type pilot valve 296. The valve section 257 is further provided with an L-shaped passageway 297, one leg 298 of which is horizontal and opens into the face of the boss 294 and the other leg 299 of which is vertical and communicates with an exhaust or drain tube 300 open to the atmosphere.

The valve section 258 is further provided with chambers 301 and 301ª adjacent to the chamber 263. One end 303 of the shaft 302 extends through a drive member 304 for the pilot valve 296. A pin 306 secures the drive member 304 to the shaft 302. The end 303 of the shaft is rounded as indicated at 305 and engages the pilot valve 296 as shown. The drive member 304 is provided with longitudinally extending pins 307 and 308 adapted to project into recesses 309 and 310 extending part way through the pilot valve disc 296. The pilot valve 296 is positioned in the chamber 263 so that a face 312 thereof is adjacent the rounded portion 305 of the shaft 302 and its opposite face 313 mates with the face of the boss 294.

Suitable packing 314 is disposed in the chamber 301 in surrounding relation to the shaft 302 and seals the shaft against leakage of pressure fluid from the chamber 263. The packing 314 is compressed by a washer 315 slidably mounted on the shaft 302 and threaded into the wall of chamber 301. A second washer 316 is arranged on said shaft in the chamber 301ª adjacent the driving member 304. This second washer serves as a bearing support for one end of the shaft 302. A spring 317 surrounds the shaft 302 between the washers 315 and 316 and urges the pilot valve disc 296 against its seat.

Figures 6, 7, 8, 9, 10:
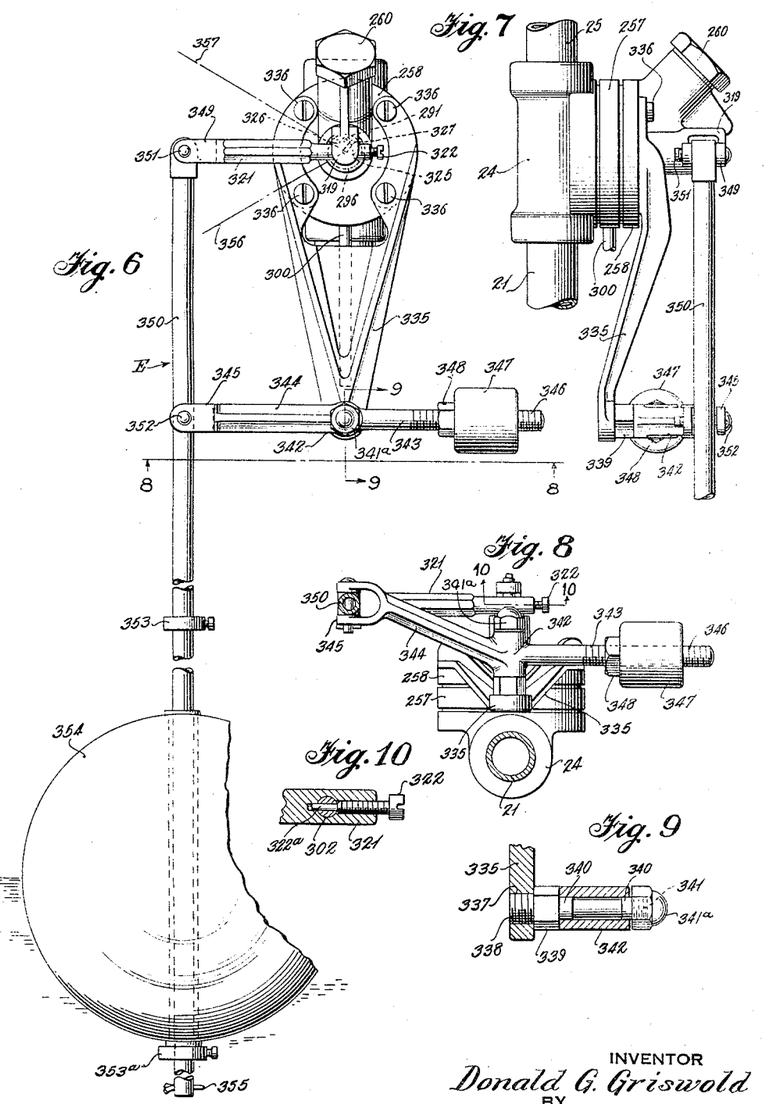
Figure 6 is a detail view of the float and linkage for operating the brine control valve.
Figure 7 is a side elevation of the brine control valve and its operating linkage shown in Figure 6.
Figure 8 is a bottom plan view of the brine control valve and operating linkage taken on the line 8—8 of Figure 6.
Figure 9 is a sectional view taken on the line 9—9 of Figure 6 showing the mounting details of the lower arm of the brine valve operating linkage.
Figure 10 is a sectional view taken on the line 10—10 of Figure 8 showing the details of mounting the actuating arm on the shaft which drives the brine pilot valve disc.

The outer end 318 of the shaft 302 is supported in a web 319 depending from the valve section 258. The portion of said valve section defining the packing chamber 301 terminates in a wall 320 spaced from the web 319 to provide an opening for the reception of an actuating arm 321. The arm 321 is secured to the shaft 302 by a screw 322 whose shank 322ª extends therethrough as shown in Figure 10. This arrangement assures proper assembly or indexing of the actuating arm on the shaft 302.

It will be noted from Figure 3 that the periphery of the pilot valve is spaced from the walls of the chamber 263 and that the pins 307 and 308 fit with clearance in the recesses 309 and 310. This arrangement permits a more or less flexible or non-rigid drive between the drive member 304 and the pilot valve disc 296; the disc being free to pivot somewhat upon the rounded end 305 of the shaft 302 to accurately align itself at all times upon the boss 294.

The pressure of the fluid in the chamber 263 aids in maintaining the pilot valve disc 296 in engagement with its seat. However, the spring 317 maintains such engagement in the absence of pressure fluid in said chamber and thereby precludes the entry of dirt or foreign matter between the valve disc and its seat.

Figure 4:
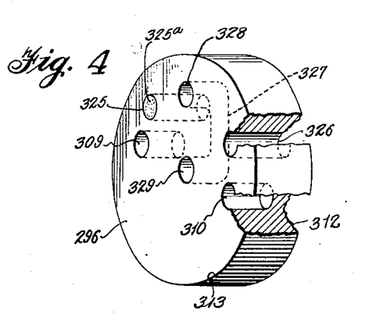
Figure 4 is a perspective view, partially in section, of the pilot valve disc employed in the brine control valve.

The pilot valve disc 296 is illustrated in perspective in Figure 4. As is here shown, the same is provided with through ports 325 and 326, respectively, each port being spaced the same distance from the axis of the disc. The pilot valve disc 296 is further provided with a U-shaped passageway generally indicated by the numeral 327 and comprising leg portions 328 and 329. The leg portion 329 is arranged on the axis of the disc and the leg 328 is spaced the same distance from the axis as the ports 325 and 326.

It will be noted from Figure 3 that the leg 329 is in alignment with the portion 298 of the exhaust passageway 297. It is to be understood that the end 293 of the passageway 291 is spaced from the portion 298 a distance equal to the spacing of the ports 325 and 326 from the leg 329, whereby either of the ports 325 or 326 and the leg 328 may be brought into registration with the portion 293 to effect closing and opening of the valve in a manner which will be described hereinafter.

A suitable linkage for operating the pilot valve shaft 302 through the arm 321 is shown in detail in Figures 6 to 10. Here, a bracket 335 is shown secured to the valve 24 by a series of screws 336. The lower end of the bracket is provided with a threaded aperture 337 (see Figure 9) to receive a stud 338. The stud 338 is preferably provided with a hexagonal portion 339 to aid in tightening the stud 338 in the aperture 337. The stud 338 is further provided with cylindrical portions 340 and a threaded end 341. A lever 342 is pivotally mounted on the portions 340 and is retained assembled on said stud by a cap nut 341ª.

The lever 342 includes a normal arm 343 and an offset arm 344 best shown in Figure 8. The end of arm 344 is bifurcated as indicated at 345 and the arm 343 is provided with threads 346. A threaded counterweight 347 and a nut 348 are mounted on the threaded portion of the arm 343, the counterweight being adjustable to any position desired and the nut serving to lock the counterweight in the desired position of adjustment.

The actuating arm 321 is bifurcated as indicated at 349 and is aligned with the bifurcated end 345 of the lever 342. A hollow rod 350 is positioned between the bifurcated ends 349 and 345 and is pivotally secured to the actuating arm 321 by a pin 351 and is likewise pivotally secured to the arm 344 of the lever 342 by a pin 352. The rod 350 is provided with spaced collars 353 and 353ª adjustably mounted thereon. A float 354 in the form of a ball is slidably mounted on the rod between said collars. A cotter pin 355 at the end of the rod 350 prevents inadvertent disassembly of the collar 353ª and float 354.

The counterweight 347 and the associated lever arm 343 are of a combined mass sufficient to counterbalance the dead weight of the valve operating linkage comprising the actuating arm 321, the lever arm 344 and the hollow rod 350. The counterweight 347 is adjustable lengthwise of the arm 343, whereby the linkage may be nicely counterbalanced. The weight of the ball float 354 is sufficient to cause the lever 342 to pivot upon its supporting stud and to cause the arm 321 to rotate the drive shaft 302 of the pilot valve 396 when the weight of said float is imposed upon the collar 353ª. Such imposition occurs when the level in the brine tank is being lowered and the float is gradually descending on the rod 350 with the liquid level and engages the collar 353ª. Upon further lowering of the liquid level, the weight of the float carries the rod 350 bodily downward and thereby moves the arm 321 to an angular position in which its center line approximates the position indicated by the dot-and-dash line 356 (Figure 6). When the liquid level is rising in the brine tank, instead of falling, the float 354 will rise on the rod 350 without affecting the position of the arm 321 and lever 342 until it engages the collar 353, whereupon it will carry the rod 350 bodily upward and thereby move the arm 321 and lever 342 to an angular position in which the center line of the arm 321 approximates the position indicated by the dot-and-dash line 357.

Let it be assumed that the cycle of regeneration has reached the salting stage and that the brine is at the proper level in the brine tank B, the arm 321 will then be in its upper angular position as indicated in Figure 1. Any suction induced in the pipe 25 at this time by the injector 185 will tend to create a vacuum in the opening or chamber 264 of the valve 24. This condition will be communicated through the passageway 265—269, the hollow stem 261 of the strainer plug 260, and the passageway 262 to the chamber 263 in which the brine pilot valve disc 296 is positioned. It is to be understood that when the arm 321 is in its upper angular position, the passageway 326 in the pilot valve 296 is in registration with the passageway 291 in the valve section 257. Hence, the pressure condition in the chamber 263 will be communicated through the port 326 and passage 291 to the diaphragm chamber 290. A partial vacuum condition in the chamber 264 will provide a like condition in the chamber 290. The higher or approximately atmospheric pressure on the fluid in the pipe 21 acts against the lower portion 257ᵇ of the diaphragm 257ª to displace the annular member 280 from the seat 284 and open the valve to permit the injector 185 to withdraw brine from the brine tank B through the pipe 21, valve 24 and pipe 25 into the fluid distribution device C from which it flows to the softener tank through the pipe 13.

So long as the injector 185 continues to draw brine from the brine tank, the brine level will be lowered and the float 354 will descend with said level until it engages the collar 353ª, and then arm 321 and lever 342 will be angularly rotated counterclockwise. The angular movement of the arm 321 imparts rotation to the shaft 302 and the pilot valve 296 carried thereby so that the port 326 is moved out of alignment with the passageway 291. In fact, the brine pilot valve herein disclosed is turned through an angle of approximately 60° by the movement of the arm 321 from one extreme angular position to the other, as indicated by the dot-and-dash lines 356 and 357 of Figure 6. However, this angle of movement is not critical and may be varied as desired provided the ports 325 and 326 are correspondingly reallocated. When the arm 321 reaches its lower angular position, the pilot valve will have been turned to a position such that the U-shaped passageway 327 registers with the passageways 291 and 298 in the valve section 257; the legs 328 and 329 of said U-shaped passageway being respectively aligned with the passageways 291 and 298. Inasmuch as the passageway 298 is open to the atmosphere through tube 300, the diaphragm chamber 290 will be placed under atmospheric pressure. The above rotation of the brine pilot valve disc 296 occurs, of course, while the injector 185 is operating. Therefore, a negative pressure or suction will exist in the chamber 264 and the diaphragm 257ª will be actuated by atmospheric pressure to close the valve and cut off the supply of brine to the injector.

The timing of the salt-rinse step is such that the flow of water through the fluid distribution device C and injector will continue for a considerable period of time after salt injection has ceased in order to rinse or flush out the brine from the softener bed 16. In other words, the brine flow continues for from three to about ten minutes and the rinse water flows for about fifteen minutes thereafter.

After rinsing is completed, the master pilot valve disc will have reached a position permitting resumption of the normal softening operation, as described in my parent patent, supra; and a back pressure is set up in the pipe line 13 which causes a portion of the water entering the distribution device to be diverted into pipe 25. The water flowing into the pipe 25, of course, will build up pressure in the chamber 264 in the valve 24. When this pressure exceeds atmospheric, the member 280 will be unseated and the water will readily pass through the passage 256 in the valve seat 284, enter the pipe 21, and discharge therefrom into the lower portion of the brine tank B. Upon continued discharge, the level in the brine tank will gradually rise and the float 354 will be carried upwardly until it engages the collar 353 on the rod 350 and return the arm 321 and the lever 342 to their original angular position. Such movement of the arm 321 will necessarily rotate the shaft 302 and the brine pilot valve 296 and return the same to their original position.

The initial return rotation of the brine pilot valve disc 296 through the float mechanism causes the leg 328 of the U-shaped passage 327 to become disaligned with the passage 291. This cuts the chamber 290 off from the atmosphere. However, since the pressure in said chamber is not changed the valve 24 remains open and does not close until the brine pilot valve 296 approaches its final position. By the time that the float 354 has moved the arm 321 into its upper angular position, the port 326 will have been brought into registration with the port 291 and then the pressure of the fluid in chamber 264 will be communicated to the chamber 290 and the diaphragm will be positively actuated to gradually cut off the flow through the passage 256 in the valve 24. Thus, the pressure of the fluid flowing through the valve 24 is itself utilized to actuate the diaphragm 257ª to close the valve.

It will be apparent from the foregoing that the fluid distribution device C and injector 185 are so associated with the valve 24 on the brine tank that the brine is automatically withdrawn and fresh water is introduced into the brine tank to serve as a subsequent charge. This same automatic draining and refilling occurs each time that the softener bed is regenerated. It will also be apparent that the volume of the brine charge may be varied by adjusting the position of the collar 353ª on the rod 350.

The valve 24 has been shown in open position in Figure 3 for convenience in illustration, and it is to be clearly understood that this valve is normally closed and remains closed during normal softening service and that the same is open only during the times that the brine charge is being withdrawn from the brine tank B and fresh water is being introduced into the brine tank to provide a new charge.

In the foregoing description of the automatic operation of the brine tank, no function has been ascribed to the port 325 of the brine pilot valve disc. In practice this port is packed with a waterproof grease 325a to lubricate the valve disc 296 in its travel over the valve seat 294. Any pressure fluid in the chamber 263 tends to force the grease against the valve seat 294 and thereby maintains a sufficient film of grease on said seat to keep it properly lubricated.

While the invention has been described and illustrated in a preferred form, the same may be embodied in other arrangements without departing materially from the spirit thereof or the scope of the appended claims.

I claim:

1. Apparatus comprising, a valve body; a diaphragm in said valve body for controlling the flow of fluid therethrough; a pilot valve for controlling the application of pressure to said diaphragm; a shaft for rotating said pilot valve; an actuating arm connected to said shaft; a lever; bracket means secured to said valve body pivotally supporting said lever relative to said valve body for rotation about an axis lying in a substantially common vertical plane with the axis of said shaft; and a rod pivotally secured to said actuating arm and said lever, respectively.

2. Means for actuating a pilot-controlled diaphragm valve, having a main valve body, a pilot valve and a drive shaft for rotating said pilot valve, comprising: an actuating arm connected to the drive shaft of said pilot valve; means limiting the angular movement of said actuating arm in opposite directions; a member adapted to be pivotally supported by said main valve body below said drive shaft for rotation about an axis lying in a substantially common vertical plane with the axis of said drive shaft; a rod pivotally connected to said actuating arm and said member, respectively, with said actuating arm and member in substantially parallel relation; longitudinally spaced collars on said rod; and a float slidably mounted upon said rod between said collars.

3. Apparatus comprising, a valve body; a diaphragm in said valve body for controlling the flow of fluid therethrough; a pilot valve for controlling the application of pressure to said diaphragm; a shaft for rotating said pilot valve; an actuating arm connected to said shaft; a bracket depending from said valve body; a lever pivotally mounted upon said bracket; and a rod pivotally connected to said actuating arm and said lever, respectively.

4. Means for actuating a pilot-controlled diaphragm valve, having a body, a pilot valve and a drive shaft for rotating said pilot valve, comprising: an actuating arm connected to the drive shaft of said pilot valve; a bracket depending from said valve body; a lever pivotally mounted upon said bracket; a rod pivotally connected to said actuating arm and said lever, respectively; longitudinally spaced collars on said rod; and a float slidably mounted upon said rod between said collars.

5. Apparatus comprising, a valve body; a diaphragm in said valve body for controlling the flow of fluid therethrough; a pilot valve for controlling the application of pressure to said diaphragm; a shaft for rotating said pilot valve; an actuating arm connected to said shaft; a bracket depending from said valve body, said bracket including spaced legs secured to said valve body; a lever pivotally mounted upon said bracket; a rod pivotally secured to said actuating arm and said lever; a pair of collars adjustably mounted upon said rod and longitudinally spaced thereon; a float slidably mounted upon said rod between said collars; and a counterweight carried by said lever, said counterweight being of a mass at least as great as the dead weight of said actuating arm, lever, rod, and collars, whereby to counterbalance the same.

6. Means for controlling the level of fluid in a tank comprising, a main valve; a rotatable pilot element for controlling the flow through said main valve extending through a wall of said main valve; an actuating arm connected to said rotatable element at one end thereof; a lever positioned below said actuating arm; means on said main valve pivotally supporting said lever for rotation about an axis lying in a substantially common vertical plane with the axis of said rotatable element; a rod pivotally connected to said actuating arm and one arm of said lever with said arms arranged substantially parallel; a pair of spaced collars on said rod; a float slidably mounted upon said rod between said collars; and a counterweight upon the other arm of said lever, said counterweight being of a mass sufficient to balance the dead weight of the pivotally connected parts.

7. Means for controlling the level of fluid in a tank comprising, a main valve; a rotatable element carrying a ported pilot valve member for controlling the flow through said valve, said rotatable element extending through a wall of said valve; an actuating arm connected to said rotatable element at one end thereof; a lever positioned below said actuating arm; means on said main valve pivotally supporting said lever for rotation about an axis lying in a substantially common vertical plane with the axis of said rotatable element; a rod pivotally connected to said actuating arm and one arm of said lever with said arms arranged substantially parallel; a pair of spaced collars on said rod; a float slidably mounted upon said rod between said collars; an adjustable counterweight upon the other arm of said lever, said counterweight being of a mass sufficient to balance the dead weight of said actuating arm, lever, rod, and collars about the pivotal suppport of said lever; and means for limiting the angular movement of said rotatable element in opposite directions.

8. Means for controlling the level of fluid in a tank comprising, a main valve; a rotatable pilot valve element for controlling the flow through said valve extending through a wall of said valve; an actuating arm connected to said rotatable element at one end thereof; a lever positioned below said actuating arm; means on said main valve pivotally supporting said lever for rotation about an axis lying in a substantially common vertical plane with the axis of said rotatable element, said lever comprising a normal arm and an offset arm; a rod pivotally connected to said actuating arm and offset arm, respectively, with said arms arranged substantially parallel; a pair of spaced collars on said rod; a float slidably mounted upon said rod between said collars; and a counterweight upon the normal arm of said lever, said counterweight being of a mass sufficient to balance the dead weight of said actuating arm, lever, rod, and collars about the pivotal support of said lever.

9. Apparatus comprising, a valve body; a diaphragm in said valve for controlling the flow of a fluid therethrough; a pilot valve for controlling the application of pressure to said diaphragm; a shaft for rotating said pilot valve; an actuating arm connected to said shaft; a bracket depending from said valve body; a lever pivotally mounted upon said bracket, said lever comprising a normal arm and an offset arm; a rod pivotally secured to said actuating arm and said offset arm, respectively; a pair of collars adjustably mounted upon said rod and longitudinally spaced thereon, a float slidably mounted upon said rod between said collars; and a counterweight carried by said lever, said counterweight being of a mass sufficient to balance the dead weight of said actuating arm, lever, rod, and collars, whereby to counterbalance the same.

10. Means for controlling the level of fluid in a tank comprising, a main valve; a rotatable pilot valve element for controlling the flow through said valve extending through a wall of said valve; an actuating arm connected to said rotatable element at one end thereof; a lever positioned below said actuating arm; means on said main valve pivotally supporting said lever for rotation about an axis lying in a substantially common vertical plane with the axis of said rotatable element, said lever comprising a normal arm and an offset arm, one end of said actuating arm and said offset arm, respectively, being bifurcated and in substantially vertical alignment; a rod pivotally connected to said actuating arm and offset arm with said arms arranged substantially parallel; a pair of spaced collars on said rod; a float slidably mounted upon said rod between said collars; and a counterweight adjustable upon the normal arm of said lever, said counterweight being of a mass sufficient to balance the dead weight of said actuating arm, lever, rod, and collars about the pivotal support of said lever.

11. Means for actuating a pilot-controlled diaphragm valve, having a body, a pilot valve and a drive shaft for rotating said pilot valve, said pilot valve having angularly spaced ports for effecting opening and closing, respectively, of said diaphragm valve, comprising: an actuating arm connected to the drive shaft of said pilot valve; a member pivotally mounted below said drive shaft; a rod pivotally connected to said actuating arm and said member, respectively; longitudinally spaced collars on said rod; a float slidably mounted upon said rod between said collars; and means for limiting the angular movement of one of said pivotally connected members to an extent corresponding to the angularly spaced ports of said pilot valve.

12. In combination, a pilot-controlled diaphragm valve having a body, a pilot disc, said pilot disc having angularly spaced ports for effecting opening and closing, respectively, of said diaphragm valve, and a drive shaft for rotating said pilot disc; an actuating arm connected to the drive shaft of said pilot disc; a member pivotally mounted below said drive shaft; a rod pivotally connected to said actuating arm and said member, respectively; longitudinally spaced collars on said rod; a float slidably mounted upon said rod between said collars; and means for limiting the angle of rotation of said drive shaft to an extent corresponding to the angularly spaced ports of said pilot disc.

13. Means for controlling the discharge of fluid from and the level of fluid in a tank comprising, a valve; a rotatable element carrying a ported pilot disc for controlling the flow through said valve, said rotatable element extending through a wall of said valve; an actuating arm rigidly connected to said rotatable element; a second arm positioned below said actuating arm; means pivotally supporting said second arm; one end of said actuating arm and said second arm being in substantially vertical alignment; a rod pivotally connected to said actuating arm and second arm, respectively; a pair of spaced collars on said rod; a float slidably mounted upon said rod between said collars; and means for limiting the rotary movement of said rotatable element.

14. Means for controlling the discharge of fluid from and the level of fluid in a tank comprising, a valve; a rotatable element carrying a ported pilot disc for controlling the flow through said valve, said rotatable element extending through a wall of said valve and having a transverse aperture extending therethrough at a predetermined angle relative to the ports in said pilot disc; an actuating arm connected to said rotatable element, said arm having a longitudinal hole therein; a fastening element extending through said opening and into the aperture in said rotatable element; a second arm positioned below said actuating arm; means pivotally supporting said second arm; one end of said actuating arm and said second arm being in substantially vertical alignment; a rod pivotally connected to said actuating arm and second arm, respectively; a pair of spaced collars on said rod; a float slidably mounted upon said rod between said collars; and means for limiting the rotary movement of said actuating arm.

15. Apparatus for controlling the withdrawal of fluid from and admission of fluid to a tank comprising, a main valve including a body; a rotatable pilot member in said valve body operable to control the opening and closing of said main valve; a shaft connected to said rotatable member for turning said rotatable member; an actuating arm connected to said shaft; a bracket depending from said main valve body; a lever pivotally mounted upon said bracket; and a rod pivotally connected to said actuating arm and said lever, respectively.

16. Liquid level control apparatus comprising, a tank adapted to contain a liquid; a pressure-responsive valve for controlling the admission and withdrawal of liquid from said tank, said pressure-responsive valve having piping connected to the opposite sides thereof, a first section of pipe extending from one side of said pressure-responsive valve into said tank to a desired depth and a second section of pipe extending from the other side of said pressure-responsive valve and adapted to be successively connected with a source or liquid under pressure during filling of said tank and to a source of suction to effect withdrawal of liquid from said tank, said pressure-responsive valve including a pressure chamber for operating fluid to effect closing thereof; a pilot valve including an element for controlling the supply and venting of operating fluid to said pressure chamber of said pressure-responsive valve; and a float mechanism in said tank for actuating said pilot element including a float member and means for actuating said pilot element in accordance with the rise and fall of said float member as the liquid level varies in said tank, said pilot element having two operative positions: one, corresponding to the low liquid level position of said float member for venting said pressure chamber of said pressure-responsive valve to the atmosphere to permit atmospheric pressure to close said valve when suction is effective in said second pipe and to also allow said pressure-responsive valve to be forced open to permit filling of said tank when pressure is effective in said second pipe section, and another corresponding to the high liquid level position of said float member and in which operative position communication is established between said pressure chamber of said pressure-responsive valve and said second pipe section while pressure is still effective in said second pipe section, whereby said pressure-responsive valve is closed by liquid under pressure derived from said second pipe section to shut off further flow of liquid into said filled tank, and said pressure-responsive valve is also subsequently permitted to be forced open by atmospheric pressure acting upon the liquid in said tank causing said liquid to flow upwardly through said first pipe section when the pressure in said pressure chamber is relieved by suction in said second pipe section to thus effect withdrawal of liquid from said tank, said pilot element having an intermediate position in which communication between the pressure chamber of said pressure-responsive valve and both said second pipe and the atmosphere is obstructed.

17. Liquid level control apparatus comprising, a tank adapted to contain a liquid; a pressure-responsive valve for controlling the admission and withdrawal of liquid from said tank, said pressure-responsive valve having piping connected to the opposite sides thereof, a first section of pipe extending from one side of said pressure-responsive valve into said tank to a desired depth and a second section of pipe extending from the other side of said pressure-responsive valve and adapted to be successively connected with a source of liquid under pressure during filling of said tank and to a source of suction to effect withdrawal of liquid from said tank, said pressure-responsive valve including a pressure chamber for operating fluid to effect closing thereof; a pilot valve for controlling the supply and venting of operating fluid to said pressure chamber of said pressure-responsive valve, said pilot valve having a pilot disc chamber for operating fluid communicating with said second pipe section, a rotatable ported pilot disc in said pilot disc chamber for controlling communication between said pilot disc chamber and said pressure chamber of said pressure-responsive valve, and a drive shaft for said pilot disc; and a float mechanism in said tank for actuating said pilot valve including a float member, and an arm connected with said pilot disc drive shaft operable by the rise and fall of said float member as the liquid level varies in said tank, said pilot disc having two operative positions: one, corresponding to the low liquid level position of said float member for venting said pressure chamber of said pressure-responsive valve to the atmosphere to permit atmospheric pressure to close said valve when suction is effective in said second pipe section and to also allow said pressure-responsive valve to be forced open to permit filling of said tank when pressure is effective in said second pipe section, and another corresponding to the high liquid level position of said float member and in which operative position communication is established between said pressure chamber of said pressure-responsive valve and said second pipe section while pressure is still effective in said second pipe section, whereby said pressure responsive valve is closed by liquid under pressure derived from said second pipe section to shut off further flow of liquid into said filled tank, and said pressure-responsive valve is also subsequently permitted to be forced open by atmospheric pressure acting upon the liquid in said tank causing said liquid to flow upwardly through said first pipe section when the pressure in said pressure chamber is relieved by suction in said second pipe section to thus effect withdrawal of liquid from said tank, said pilot disc having an intermediate position in which communication between the pressure chamber of said pressure responsive valve and both said second pipe and the atmosphere is obstructed.

18. Liquid level control apparatus comprising, a tank adapted to contain a liquid; a pressure-responsive valve for controlling the admission and withdrawal of liquid from said tank, said pressure-responsive valve having piping connected to the opposite sides thereof, a first section of pipe extending from one side of said pressure-responsive valve into said tank to a desired depth and a second section of pipe extending from the other side of said pressure-responsive valve and adapted to be successively connected with a source of liquid under pressure during filling of said tank and to a source of suction to effect withdrawal of liquid from said tank, said pressure-responsive valve including a pressure chamber for operating fluid to effect closing thereof; a pilot valve including a rotatable pilot disc for controlling the supply and venting of operating fluid to said pressure chamber of said pressure-responsive valve; a drive shaft connected with said pilot disc; an actuating arm connected to said drive shaft; a lever positioned below said actuating arm; means pivotally supporting said lever relative to said pressure-responsive valve, a rod pivotally connected at its upper end to said actuating arm and lever, respectively, with said arm and lever arranged in substantially parallel relation, the lower end of said rod extending into said tank; a pair of spaced collars on said rod; and a float in said tank slidably mounted upon said rod between said collars, said collars being located upon said rod to predetermine the maximum high and low levels of liquid in said tank, said pilot valve having two operative positions; one, of said operative positions corresponding to the low liquid level position of said float member for venting said pressure chamber of said pressure-responsive valve to the atmosphere to permit atmospheric pressure to close said valve when suction is effective in said second pipe and to also allow said pressure-responsive valve to be forced open to permit filling of said tank when pressure is effective in said second pipe section, and another corresponding to the high liquid level position of said float member and in which operative position communication is established between said pressure chamber of said pressure-responsive valve and said second pipe section while pressure is still effective in said second pipe section, whereby said pressure-responsive valve is closed by liquid under pressure derived from said second pipe section to shut off further flow of liquid into said filled tank, and said pressure-responsive valve is also subsequently permitted to be forced open by atmospheric pressure acting upon the liquid in said tank causing said liquid to flow upwardly through said first pipe section when the pressure in said pressure chamber is relieved by suction in said second pipe section to thus effect withdrawal of liquid from said tank, said pilot disc having an intermediate position in which communication between the pressure chamber of said pressure-responsive valve and both said second pipe and the atmosphere is obstructed.

19. Liquid level control apparatus comprising, a tank adapted to contain a liquid; a diaphragm valve for controlling the admission and withdrawal of liquid from said tank, said diaphragm valve having piping connected to the opposite sides thereof, a first section of pipe extending from one side of said diaphragm valve into said tank to a desired depth and a second section of pipe extending from the other side of said diaphragm valve and adapted to be successively connected with a source of liquid under pressure during filling of said tank and to a source of suction to effect withdrawal of liquid from said tank, said diaphragm valve including a diaphragm pressure chamber for operating fluid to effect closing thereof; a pilot valve including a rotatable pilot disc for controlling the supply and venting of operating fluid to said diaphragm chamber of said diaphragm valve; a drive shaft connected with said pilot disc; an actuating arm connected to said drive shaft; a lever positioned below said actuating arm; means pivotally supporting said lever relative to said diaphragm valve; a rod pivotally connected at its upper end to said actuating arm and lever, respectively, with said arm and lever arranged in substantially parallel relation, the lower end of said rod extending into said tank; a pair of spaced collars on said rod; a float in said tank slidably mounted upon said rod between said collars, said collars being located upon said rod to predetermine the maximum high and low levels of liquid in said tank; and a counter-weight upon said lever, said counter-weight being of a mass sufficient to balance the dead weight of said actuating arm, lever, rod and collars about the pivotal support of said lever, said pilot valve disc having two operative positions: one, of said operative positions corresponding to the low liquid level position of said float member for venting said diaphragm chamber of said diaphragm valve to the atmosphere to permit atmospheric pressure to close said diaphragm valve when suction is effective in said second pipe and to also allow said diaphragm valve to be forced open to permit filling of said tank when pressure is effective in said second pipe section, and another corresponding to the high liquid level position of said float member and in which operative position communication is established between said diaphragm chamber of said diaphragm valve and said second pipe section while pressure is still effective in said second pipe section, whereby said diaphragm valve is closed by liquid under pressure derived from said second pipe section to shut off further flow of liquid into said filled tank, and said diaphragm valve is also subsequently permitted to be forced open by atmospheric pressure acting upon the liquid in said tank causing said liquid to flow upwardly through said first pipe section when the pressure in said diaphragm chamber is relieved by suction in said second pipe section to thus effect withdrawal of liquid from said tank, said pilot disc having an intermediate position in which communication between the diaphragm chamber of said diaphragm valve and both said second pipe and the atmosphere is obstructed.

DONALD G. GRISWOLD.